July 15, 1930.  J. N. POWERS  1,770,550
FLEXIBLE COUPLING
Filed Feb. 20, 1928
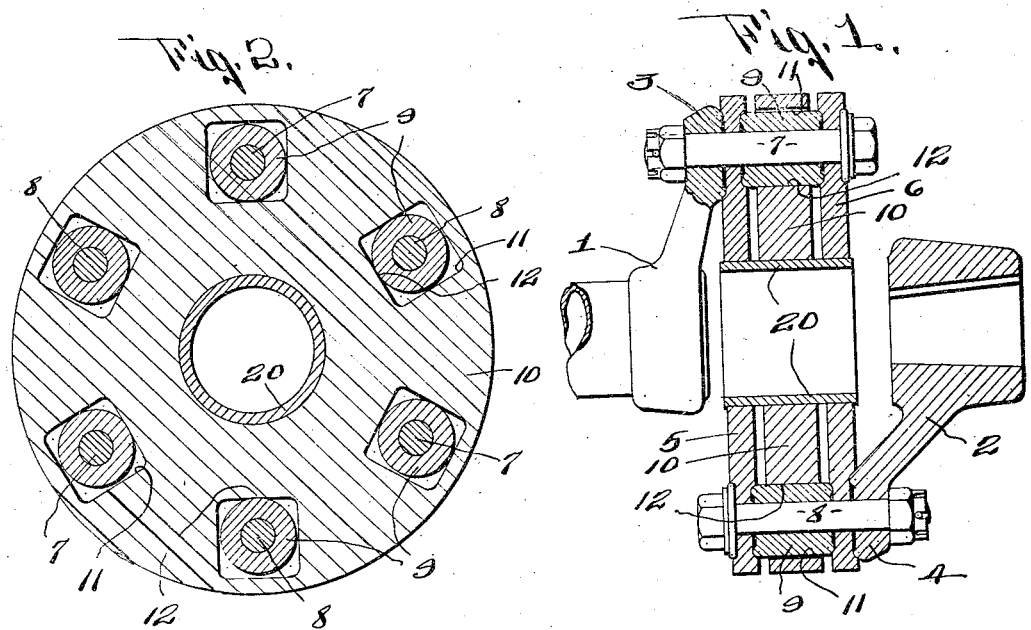
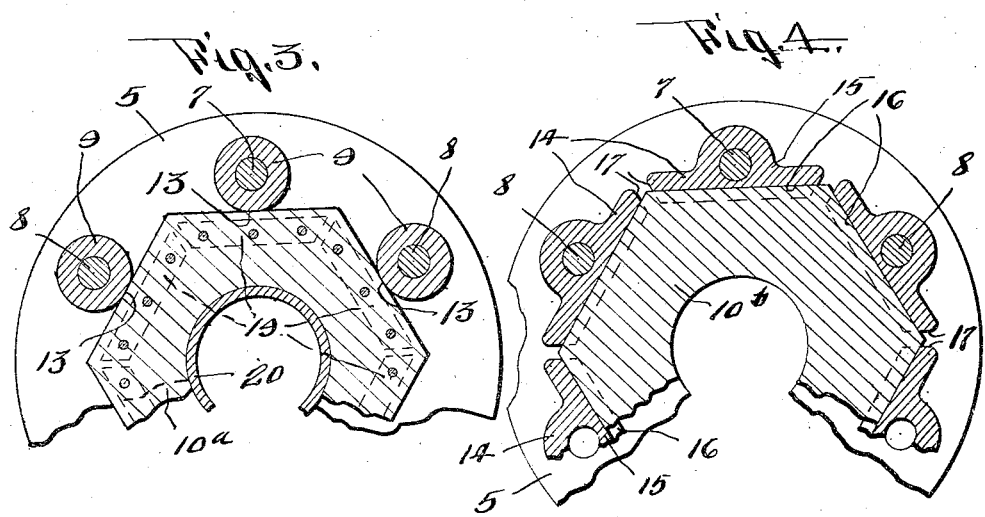
INVENTOR.
John N. Powers
BY Parsons & Bodell
ATTORNEYS.

Patented July 15, 1930

1,770,550

UNITED STATES PATENT OFFICE

JOHN N. POWERS, OF SYRACUSE, NEW YORK

FLEXIBLE COUPLING

Application filed February 20, 1928. Serial No. 255,556.

This invention relates to flexible couplings of the flexible disk type and has for its object a particularly simple and efficient means for relieving the disks which are associated respectively with the driving and driven members or spiders of torsional strain or the greater part of the torsional strain and confining the strains on these disks for the most part to radial ones, which coupling is particularly simple and economical in construction and highly efficient and durable in use.

The invention consists in the novel features and in the combinations and constructions hereinafter set forth and claimed.

In describing this invention, reference is had to the accompanying drawings in which like characters designate corresponding parts in all the views.

Figure 1 is a vertical longitudinal sectional view of a coupling embodying my invention.

Figure 2 is a vertical cross sectional view.

Figure 3 is a fragmentary view similar to Figure 2 of a modified form of the invention.

Figure 4 is a fragmentary view similar to Figure 3 of another modified form of the invention.

This coupling comprises generally driving and driven members, each having a circular series of projections or pins, the projections of one member alternating with those of the other and a motion transmitting disk arranged among these pins located as near as possible to the plane of the axis of articulation of the coupling and coacting with said pins to receive torque therefrom, but being unsecured to the pins whereby the disk is free to have a floating action to conform to the angularity of the axes between the driving and driven members, and means for holding the driving and driven members assembled, which means is relieved of all the torque or the greater part of the torque by the disk.

1 and 2 designate respectively the driving and driven members which are usually spiders having hubs mountable upon driving and driven shafts, the spiders each usually having three arms as 3, 4 which are arranged alternately with each other. Each of the arms has a pin or projection therefrom parallel to the axis of the driving or driven member and the pins on the arms of one spider alternate with those on the arms of the other spider in the usual manner.

5 and 6 are flexible disks mounted on the projecting pins adjacent the spider arms 3, 4 respectively, these disks 5, 6 being spaced apart from each other. The pins usually consist of bolts passing through the spider arms and spacers on the bolts between the disks so that each disk is lightly clamped or secured to one set of spiders near the base of the pins and to the disk adjacent the other set of spider arms at the ends of the pins.

7 designates the bolts on the spider arms 3, 8 the bolts on the spider arms 4 and 9 the spacers on these bolts. The disk 5 is located adjacent the spider arms 3 and the disk 6 adjacent the spider arms 4 so that the disk 5 is secured or clamped to the spider arms 3 adjacent said spider arms and is secured to the bolts 8 remote from the other spider arms 4. Likewise, the disk 6 is secured to the spider arm 4 by the bolts 8 and to the bolts 7 at a point remote from the spider arm 3.

10 is an intermediate disk having a floating action located between the disks 5, 6 and coacting with the spacers 9 to receive torque therefrom, this disk however being capable of a sliding floating action in order to conform to the angularity between the axes of the driving and driven members without being secured to either of said members and hence, is not subject to strains which would otherwise be located at the points of securement, and further the strains are distributed equally through the disk, these strains being torsional as well as radial. The disk 10 is of slightly less width than the space between the disk 5, 6.

In Figures 1 and 2, the disk 10 is shown as formed with square holes 11 which receive the spacers and the spacers thrust against the sides of the holes toward the center of the disks as at 12.

In Figure 3, the disk 10$^a$ is shown as hexagonal with its sides thrusting at 13 against the spacers.

In Figure 4, the disk 10$^b$ is also shown as hexagonal and the spacers 14 as having wide bases 15 having channels 16 which receive the margins of the hexagonal sides, the portions of the channels lying flat on the hexagonal sides, that is the peripheral edges. The end faces 17 of the bases are beveled and the end faces 17 adjacent the disks are spaced a short distance apart. When the disk becomes weak and collapses, the faces 17 of the adjacent bases abut against each other and transmit the torque so that the coupling will continue to function. The margin of the disk $10^a$ is shown in Figure 3 as reinforced along the margins of its hexagonal faces by strips 19 secured to opposite sides of the disk along the hexagonal faces.

The disks 5, 6, 10, $10^a$, or $10^b$ are preferably formed with a central opening in which a flexible bushing 20 is fitted.

The disk 10, $10^a$ or $10^b$ is capable of transmitting all of the torque and hence, the disks 5, 6 may be used as merely the means for holding the parts of the coupling assembled or from separation in the normal use of the coupling. However, usually the disks 5, 6 are also capable of transmitting all the torque although they are not called upon to do so.

The disks 10, $10^a$ or $10^b$ are usually somewhat flexible but may be rigid in which case they would have no radial distortion but would have a full floating or sliding movement in axial directions. Also, the flexible disks may be reinforced at their edges as shown in Figure 3 to stiffen them against radial distortion.

In operation, the torque is transmitted from the driving and driven members principally through the floating member 10 which is free to warp or distort and also shift into different angular positions to conform to the constantly changing angularity of the axes of the driving and driven members so that the disks 5, 6 are relieved of the torsional strain or the greater part thereof and are subject principally to radial distortions. As the intermediate member is not secured to either the driving or driven member and has a sliding floating action, it will always act to transmit the torque even though either or both of the disks 5, 6 become torn loose from some or all of the pins.

Hence, by this intermediate floating disk, the life of the coupling is prolonged indefinitely as the coupling can not be destroyed because of the fatiguing of the disks 5, 6.

What I claim is:

1. A flexible coupling comprising driving and driven members, each having a circular series of bearing projections, the bearing projections of one series alternating with those of the other and a disk bearing at its peripheral edge against the sides of the projections toward the center of the disk whereby it has a floating movement to conform to the angularities between the axes of the driving and driven members and means for holding said members and the disk assembled.

2. A flexible coupling comprising driving and driven members, each having a circular series of pins projecting toward the other member, the pins of one series alternating with those of the other, opposing flexible disks mounted on the series of pins adjacent said members respectively and an intermediate floating disk slidably coacting at its peripheral edge with the pins to receive torque therefrom.

3. A flexible coupling comprising driving and driven members, a circular series of pins projecting from each of the members, the pins of one member alternating with those of the other, spaced apart flexible disks mounted on the pins adjacent the driving and driven members respectively; said pins comprising clamping bolts and spacers on the bolts between the disks and a floating intermediate disk slidably coacting with the spacers and being of less width than the distance between the former disks.

4. A flexible coupling comprising driving and driven members, each having a circular series of pins projecting toward the other member, the pins of one series alternating with those of the other, opposing flexible disks mounted on the series of pins adjacent said members respectively and an intermediate floating disk slidably engaging the sides of the pins toward the axes of said members to receive and transmit torque therefrom, the disks having central alined openings and a flexible bushing mounted in the openings.

5. A flexible coupling comprising driving and driven members, a circular series of pins projecting from each of the members, the pins of one member alternating with those of the other, spaced apart flexible disks mounted on the pins adjacent the driving and driven members respectively, said pins comprising clamping bolts and spacers on the bolts between the disks and a floating intermediate disk slidably engaging with the spacers and being of less width than the distance between the former disks, the disks having alined central openings and a flexible bushing mounted in the opening.

In testimony whereof, I have hereunto signed my name, at Syracuse, in the county of Onondaga, and in the State of New York, this 15th day of Feb., 1928.

JOHN N. POWERS.